June 29, 1937.   C. H. NORDELL   2,085,326
COMMINUTER
Filed Feb. 21, 1936   3 Sheets-Sheet 3

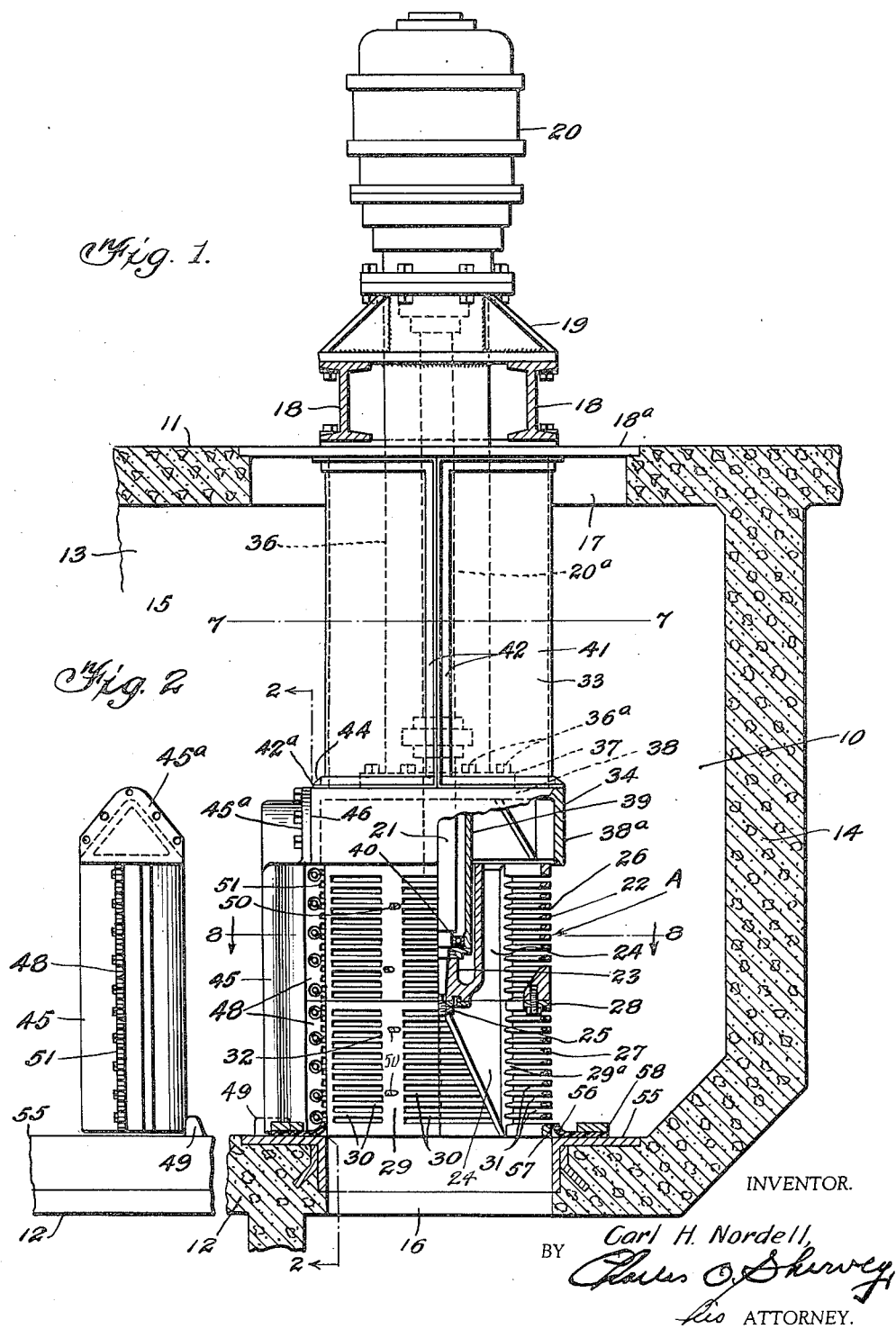

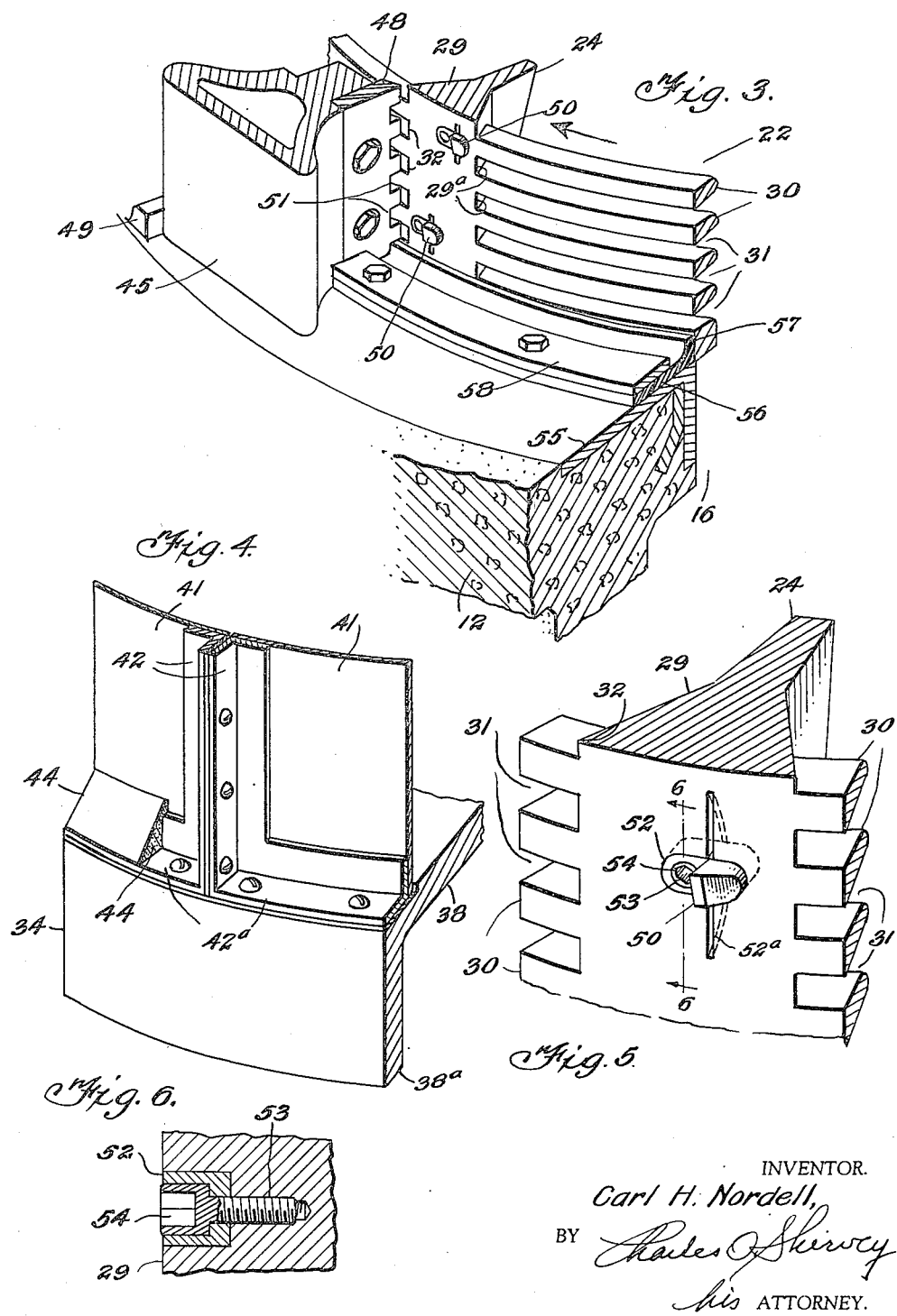

INVENTOR.
Carl H. Nordell,
BY
his ATTORNEY.

Patented June 29, 1937

2,085,326

UNITED STATES PATENT OFFICE 2,085,326

COMMINUTER

Carl H. Nordell, Chicago, Ill., assignor to Chicago Pump Company, Chicago, Ill., a corporation of Illinois Application February 21, 1936, Serial No. 65,023

20 Claims. (Cl. 210—152)

This invention relates to comminuters of the character that cut, tear, break, crush or otherwise reduce solids and semi-solids into pieces, small enough to pass through openings in a strainer wall, along with the flow of liquid.

One of the objects of this invention is the provision of a screen to strain liquid containing solids and semi-solids, and improved means, cooperating with the screen, to comminute the solid and semi-solid material carried by the liquid, whereby the comminuted material may pass through the screen along with the flow of liquid.

Another object is the provision of a shield for preventing solid and semi-solid matter from entering the screen, except through the openings in the straining wall thereof, despite the rise of the liquid level above the top of the screen.

Another object is to provide a comminuter suspended from above and having means for preventing the comminuter from binding on the bottom wall of the conduit in which it is contained.

Other objects and advantages will occur in the course of this specification, and with said objects and advantages in view, this invention consists in the several novel features hereinafter fully set forth and claimed.

The invention is clearly illustrated in the drawings accompanying this specification, in which:

Fig. 1 is a view, partly in side elevation and partly in vertical section, of a comminuter embodying a simple form of the present invention, and showing the same in connection with a fragment of a conduit in which the liquid is strained;

Fig. 2 is an elevation of a cutter bar, its supporting arm, and a fragment of the bottom wall of the conduit, the view being taken from the line 2—2 of Fig. 1;

Fig. 3 is a fragmental, perspective view of the strainer wall, the cutter bar, its support and the bottom wall of the conduit;

Fig. 4 is a fragmental, perspective view of the shield and illustrating its connection with the screen cover;

Fig. 5 is a fragmental, perspective view of the strainer wall, illustrating one of the cutting teeth thereof;

Fig. 6 is a detail, vertical, cross-section, taken on the line 6—6 of Fig. 5;

Figure 7:
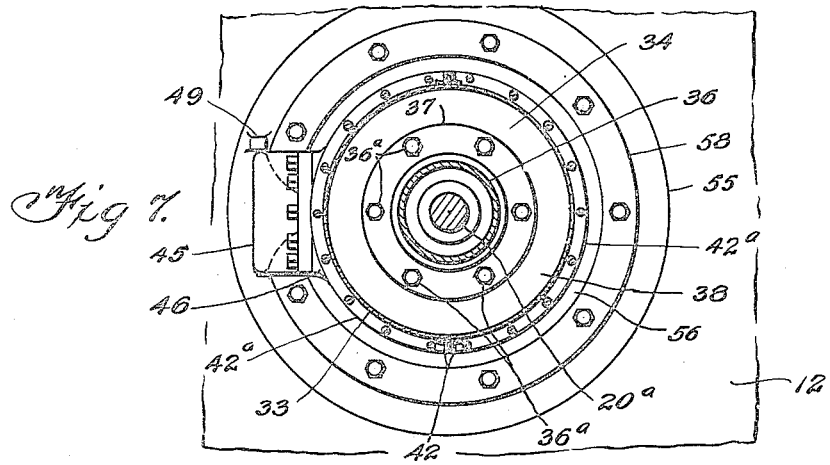
Fig. 7 is a horizontal section, taken on the line 7—7 of Fig. 1.
Figure 8:
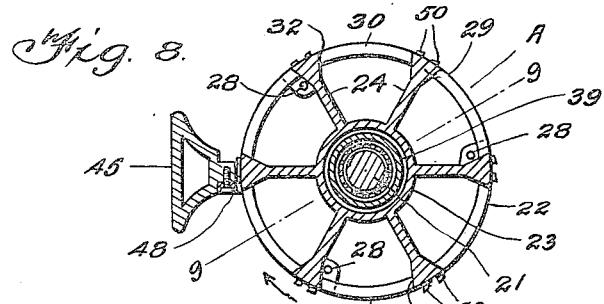
Fig. 8 is a detail, horizontal section, taken on the line 8—8 of Fig. 1.
Figure 9:
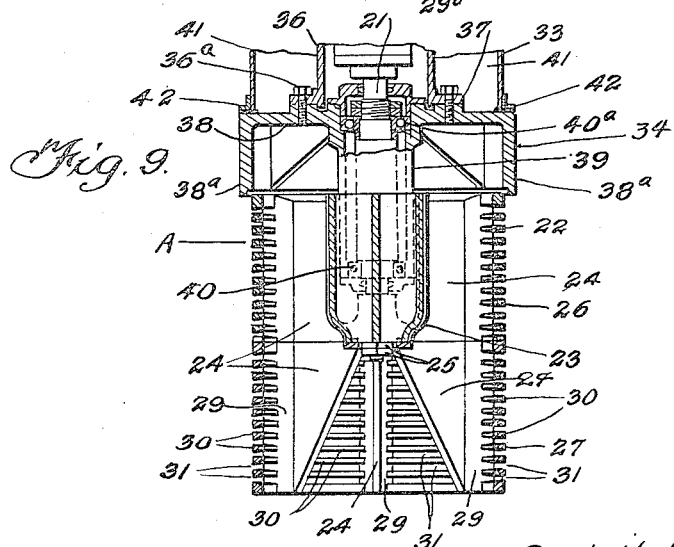
Fig. 9 is a detail, vertical section of the screen, taken on the line 9—9 of Fig. 8.

Referring to said drawings, which are merely illustrative of one embodiment of the invention, the reference character 10 designates a comminuter chamber having top and bottom walls 11, 12, side walls 13, and an end wall 14. An influent conduit 15, for conducting liquids, usually having solid and semi-solid matter floating thereon or suspended therein, leads to the chamber 10. One wall, for instance the bottom wall of the chamber, is provided with a discharge opening 16, through which the strained liquid is discharged from the chamber into a conduit which conveys the strained liquid to any desired place for further treatment.

When used for straining sewage, the apparatus intercepts solid and semi-solid materials which are too large to pass through the openings in the strainer wall of the screen and permits only liquid and small pieces of material to pass through the screen and discharge through the opening 16 into the conduit therebelow.

In the form of the invention illustrated, a hole 17 is left in the top wall 11 of the comminuter chamber, through which the comminuter is inserted into the chamber. A cover 18ª closes the hole 17. Supports 18, here shown in the form of I-beams, are supported on the top wall 11 and extend across the hole 17 and support the comminuter therebelow. Mounted on the supports 18, is a base or pedestal 19, upon which is mounted an electric motor 20, which drives the movable element of the comminuter. Connected to and extending down from the motor shaft, is a shaft extension 20ª connected at its lower ends to a comminuter shaft 21, upon the lower end of which is rigidly secured the screen or straining element, A, here shown in the form of a circumferentially slotted, cylindrical straining wall 22, having a hub 23, connected to the straining wall by spokes or webs 24. The hub is fastened upon the tapered lower end of the comminuter shaft 21 by nuts 25, or otherwise, as desired.

The strainer wall is shown as formed of upper and lower sections 26, 27, fastened together by bolts 28, but this is not necessary as the strainer wall may be made of one section if desired. Desirably each section is cast in one piece, consisting of upright ribs 29, connected by arcuate bars 30, spaced apart to leave circumferentially disposed slots 31, through which the liquid and small pieces of solid material may enter the screen. The spokes or webs 24, extend radially from the ribs 29 to the hub 23. Desirably the side faces of the ribs 29 and the end edges 29ª of the slots, taper inwardly so as to provide sharp cutting edges 32, at the ends of the slots, the purpose of which will presently appear. The outer faces of the ribs 29 and bars 30, are preferably flush with each other, and the bars taper inwardly towards the interior of the screen. The screen is open at its ends, but the strained liquid enters the screen only through the slots in the straining wall and discharges through the open lower end of the screen into the effluent conduit therebelow.

During ordinary conditions the liquid entering the comminuter chamber seldom rises above the screen, but there are occasions when the liquid rises considerably above it. To prevent liquid and solid matter carried thereby, from entering the upper open end of the screen, and to prevent solid matter from lodging upon the screen cover, a cylindrical shield 33 is provided which extends upward from the top of the screen cover 34 to any desired height. In the drawings, the shield is shown as extending to the cover plate 18ª. As shown, the shield is secured to the screen cover 34, which comprises a flanged ring-like structure, stationarily supported over the strainer wall of the screen by a hanger pipe 36, that is rigidly connected to the base or pedestal 19 and extends down through the shield to the ring structure 34, where it is secured thereto by bolts and nuts 36ª. As shown, the lower end of the hanger pipe is flanged outwardly, as at 37, and the ring structure is formed with an inwardly extending, horizontal annular top piece 38, to which the hanger pipe flange 37 is bolted. As shown, a sleeve 39 projects down from the top piece 38, of the ring structure 34, and carries a steadying bearing 40 for the lower end of the comminuter shaft 21, and in certain constructions a thrust bearing 40ª may be carried by the ring structure 34 for the comminuter shaft 21. A flange 38ª projects down from the margin of the top piece 38 to the top of the screen.

The shield may be composed of a number of arcuate plates 41, secured together as by angle iron members 42, welded or otherwise secured to the plates, and bolted or otherwise fastened together, and the plates 41 may be fastened to the top 38 of the ring structure 34 by angle irons 42ª, secured to the plates and bolted or otherwise secured to the top of the ring structure.

To prevent matter from lodging in the corners between the shield 33 and the ring structure 34, plastic or other strips of material 44 may be applied in the corners at the bottom of the shield. The exposed sides of the strips 44 are inclined so as to permit matter to freely slide off the strips 44 instead of lodging in the corner spaces formed between the shield and ring structure.

Bolted or otherwise rigidly secured to the ring structure 34, is the cutter bar supporting arm 45, which extends down from the side of the ring structure to the bottom of the conduit. As shown, the flange 38ª of the ring structure 34 is formed at one side with a flattened face 46, to which a flattened face 45ª of the arm 45 is bolted. The top of the arm 45 is made in the form of a peak to prevent solid matter from lodging thereon.

Bolted or otherwise secured to the arm 45, is a cutter bar 48, which, if desired, may be formed in several sections. The cutter bar 48 co-operates with the straining wall of the screen to comminute solid matter detained by the outer face of the wall and also matter which has partially entered the screen through the slots and protrudes from the outer face of the wall. As shown, the cutter bar and its supporting arm are supported from the ring structure and their lower ends are free. To take up any shocks that occur, as a result of the comminuting action, a shoulder or abutment member 49 is provided on the bottom wall of the comminuter chamber in position to engage with the arm 45, thereby absorbing the impact.

The cutting edge of the cutter bar is disposed contiguous with the outer face of the strainer wall and extends across the slots thereof and co-operates with the end edges of the slots to comminute any material which has partially entered the screen, but protrudes beyond the outer face thereof.

Projecting outwardly from the outer face of the strainer wall are cutting teeth 50 which co-operate with the cutter bar 48 to comminute solid matter detained by the strainer wall. To permit the teeth 50 to pass the cutter bar 48, the latter is notched, as shown at 51, for the passage of the cutting teeth 50 past the cutter bar, and the edges of said notches form cutting edges which co-operate with the cutting teeth 50 to comminute solid and semi-solid matter caught between the cutter bar and cutter teeth. The cutting teeth and notches 51 are disposed in line with the bars 30 of the strainer wall and the toothed parts of the cutter bar are disposed in line with the slots 31 of the strainer wall and are slightly wider than the same. The cutting teeth 50 are slightly narrower than the bars so as to pass through the notches in the cutter bar.

The cutting teeth 50 are arranged in staggered relation along the ribs 29 of the strainer wall and may be formed upon bases or blocks 52, let into sockets formed in the ribs 29 and fastened to the ribs by bolts 53, which have socketed heads 54 countersunk in the blocks 52. For convenience in removing the cutting elements from the strainer wall, grooves 52ª are formed in the face of the wall through which an instrument may be inserted behind the cutting teeth bases 52 for the purpose of prying the same out of the sockets.

A flanged ring 55 anchored to the bottom wall of the comminuter chamber, forms a facing for the upper face of the bottom wall and the cylindrical face of the discharge opening 16. To prevent rags or other stringy material from passing between the lower end of the strainer wall and the flanged ring 55, and becoming wedged therebetween, and thereby causing the screen to bind upon the ring 55, I provide a resilient ring 56, desirably composed of rubber or like composition, which ring is turned up at its inner edge to provide an upturned lip 57 which bears against the side of the lowermost bar of the screen. The ring 56 is secured in place upon the flanged ring 55 by a clamp ring 58, bolted to the flanged ring 55. The resilient ring 56 bears against the lowermost bar of the screen and prevents rags and other stringy material from entering the clearance space between the screen and flanged ring 55.

In operation, the sewage or other liquid entering the comminuter chamber 10, through the influent conduit 15, passes through the slots of the straining wall and discharges through the opening 16 into the effluent conduit. Solid and semi-solid material of less dimensions than the slots 31 pass through the slots and into the interior of the screen, and larger solids are detained by the outer face of the screen. Any matter which enters but protrudes outwardly from the slots 31 encounters the toothed members of the cutter bar, and when the ends of the slots pass the cutter bar, such protruding pieces are sheared off, thereby permitting the pieces within the slots to pass on along with the stream. Other solids which are detained by the screen and carried around to the cutter bar, are acted upon by the cutting teeth 50 and cutter bar 48 and are reduced to pieces small enough to pass through the slots of the strainer wall.

More or less variation of the exact details of construction is possible without departing from the spirit of this invention. I desire, therefore, not to limit myself to the exact form of the construction shown and described, but intend, in the following claims, to point out all of the invention disclosed herein.

I claim as new and desire to secure by Letters Patent:

1. A comminuter comprising a straining wall, composed of spaced bars connected by elements which extend transversely between the bars and provide cutting edges, said bars and transverse elements being substantially flush on one side of the straining wall and the bars tapering rearwardly in cross-section from said flush faces, and a cutting bar disposed entirely at one side of said straining wall and co-operating with said cutting edges to comminute material, the straining wall and cutting bar being relatively movable in cutting relation to one another.

2. A comminuter comprising a straining wall, composed of spaced bars connected by elements which extend transversely between the bars and provide cutting edges, said bars and transverse elements being substantially flush on one side of the straining wall, a cutter bar having cutting edges co-operating with the cutting edges of said transverse elements to shear off material that protrudes from the spaces between the bars, and means to produce relative cutting movement between said straining wall and cutter bar.

3. A comminuter comprising a straining wall, composed of spaced bars connected by elements which extend transversely between the bars and provide cutting edges, said bars and transverse elements being substantially flush on one side of the straining bar, teeth on said straining wall, disposed in line with said bars, a cutter bar having cutting edges co-operating with the cutting edges of said transverse elements, and other cutting edges co-operating with said teeth, and means to produce relative cutting movement between said straining wall and cutter bar.

4. A comminuter comprising a straining wall, composed of spaced bars connected by elements which extend transversely between the bars and provide cutting edges, said bars and transverse elements being substantially flush on one side of the straining wall, cutting teeth on said straining wall, disposed in line with said bars and in staggered relation, a cutter bar having cutting edges co-operating with the cutting edges of said transverse elements and other cutting edges co-operating with said cutting teeth, and means to produce relative cutting movement between said straining wall and cutter bar.

5. A comminuter comprising a cylindrical straining wall, composed of spaced bars connected by elements which extend transversely between the bars and provide cutting edges, said bars and transverse elements being substantially flush on one side of the straining wall, a cutter bar having cutting edges co-operating with the cutting edges of said transverse elements to shear off material that protrudes from the spaces between the bars, and means to produce relative cutting movement between said straining wall and cutter bar.

6. A comminuter comprising a cylindrical straining wall, composed of spaced bars connected by elements which extend transversely between the bars and provide cutting edges, said bars and transverse elements being substantially flush on one side of the straining bar, teeth on said straining wall, disposed in line with said bars, a cutter bar having cutting edges co-operating with the cutting edges of said transverse elements, and other cutting edges co-operating with said teeth, and means to produce relative cutting movement between said wall and cutter bar.

7. A comminuter comprising a straining wall, composed of spaced bars connected by elements which extend transversely between the bars and provide cutting edges, said bars and transverse elements being substantially flush on one side of the strainer wall, cutting teeth on said transverse elements in line with said bars, said cutting teeth being narrower than the bars, and a cutter bar having cutting edges contiguous with said flush faces of the bars and spanning the spaces therebetween, said cutter bar having notches for the passage of the cutting teeth past the bar and having cutting edges co-operating with said cutting teeth to shear off material caught between the cutting teeth of the cutter bar.

8. A comminuter comprising a straining wall composed of spaced bars connected by elements which extend transversely between the bars and provide cutting edges, said bars and transverse elements being substantially flush on one side of the strainer wall, cutting teeth on said straining wall in line with the bars, said teeth being narrower than the bars, a cutter bar having cutting edges spanning the spaces between the bars and co-operating with the end edges of said transverse elements to shear off material, said cutting bar having also notches to permit the passage of the teeth past the cutter bar, the edges of said notches co-operating with said teeth to shear off material caught between the teeth and cutter bar.

9. A comminuter comprising in combination a comminuter chamber having a top wall and a bottom wall, formed with aligned openings, supporting means above the top wall, a cylindrical rotatory open-ended screen suspended from said supporting means over the opening in the lower wall, a stationary cutter bar suspended from said supporting means, a cylindrical screen cover extending up from the upper edge of the screen, and being suspended from said supporting means, and an upright cylindrical shield extending up from the edge portion of the screen cover substantially to the top wall of the comminuter chamber.

10. A comminuter comprising in combination an open-ended cylindrical screen disposed in the path of a flowing stream containing solids, said screen having slots in its wall through which liquids and comminuted solids enter the screen, a cutter bar co-operating with the screen to comminute solids, and a cylindrical screen shielding means of approximately the same diameter as that of the screen, extending from the upper edge thereof, up through said flowing stream to a point above the level thereof.

11. A comminuter comprising in combination a rotatory cylindrical screen, a stationarily supported, vertically extending arm having a peaked top, located below the high level of liquid passing through said screen, and a cutter bar mounted on said arm and co-operating with said screen to comminute solids.

12. A comminuter comprising in combination a comminuter chamber having a top wall and a bottom wall, supporting means above the top wall, a shaft suspended from said supporting means, a cylindrical screen carried by said shaft, said screen having cutting edges thereon a hanger pipe suspended from said support, a ring-like structure carried by the hanger pipe above the screen, an arm carried by the ring-like structure, and a cutter bar secured to said arm and having cutting edges co-operating with the cutting edges of said screen to comminute material.

13. A comminuter comprising in combination a comminuter chamber having a top and a bottom wall, supporting means above the top wall, a shaft suspended from the supporting means, a cylindrical screen carried by said shaft, said screen having cutting edges thereon, a hanger pipe suspended from said support, a ring-like structure carried by the hanger bar above the screen, a supporting arm carried by the ring-like structure, an abutment member on the bottom wall, against which said supporting arm abuts, and a cutter bar carried by said arm and having cutting edges co-operating with the cutting edges of the screen to comminute material.

14. The combination of a rotary upright cylindrical screen, a support above the screen from which the latter is suspended, a horizontal wall adjacent the bottom of the screen having an opening therethrough disposed in co-axial alignment with the axis of the screen, and a flexible ring secured to said wall at the edge of the opening and having an upturned lip contacting with the side of the screen, said flexible ring serving to prevent the passage of material between the screen and edge of the opening.

15. A comminuter, comprising a straining wall having parallel slots therein, the ends of which have edges flush with one face of the wall and comprise shearing elements, a cutter bar having cutting edges disposed entirely at one side of said wall and co-operating with the ends of the slots to shear off material which protrudes therefrom, and means for moving one of said members in cutting relation to the other.

16. A comminuter comprising a cylindrical straining member having circumferentially disposed slots in its cylindrical wall, a cutting member disposed entirely at one side of said wall and having cutting edges traversing said slots and co-operating with the ends thereof to shear off material which protrudes therefrom, and means to move one of said members relatively to the other in cutting relation.

17. The method of treating a liquid stream containing solids, which consists in intercepting the larger solids and passing the liquid and smaller solids through a straining wall, shearing off solids that protrude from the straining wall and reducing the intercepted solids which are too large to enter the openings in the straining wall to pieces small enough in size to pass through the straining wall along with the flow of the liquid.

18. A comminuter comprising a cylindrical straining wall, composed of ribs extending lengthwise of the wall and spaced arcuate bars connecting the ribs, the outer faces of the ribs and bars being substantially flush and there being cutting edges on the ribs at the ends of the slots formed by the spaced bars, a cutter bar located externally of the straining wall and having a cutting edge co-operating with the cutting edges of the ribs to shear off material that protrudes from the slots, and means to produce relative cutting movement between the straining wall and cutting bar.

19. A comminuter comprising a cylindrical straining wall composed of ribs extending lengthwise of the wall and spaced arcuate bars connecting the ribs, the outer faces of the ribs and bars being substantially flush and there being cutting edges on the ribs at the ends of the slots formed by the spaced bars, cutting teeth mounted on said ribs in alignment with said bars, a notched cutter bar located externally of the straining wall and having cutting edges co-operating with the cutting edges of the ribs to shear off material that protrudes from the slots, the edges of the notches of said cutting bar co-operating with said cutting teeth to comminute material, and means to produce relative cutting movement between the straining wall and cutting bar.

20. In combination, a rotatory comminuter screen comprising spaced arcuate bars having faces that are flush with each other, cutting elements which extend between the bars and have faces flush with the faces of the bars, cutting teeth on said cutting elements, and a stationary cutting bar co-operating with said cutting elements and having notches for the passage of the cutting teeth past the cutting bars, the edges of the notches co-operating with the cutting teeth to comminute material.

CARL H. NORDELL.